No. 794,009. PATENTED JULY 4, 1905.
J. A. HAMELBACK.
SURFACE CULTIVATOR.
APPLICATION FILED SEPT. 7, 1904.
2 SHEETS—SHEET 1.
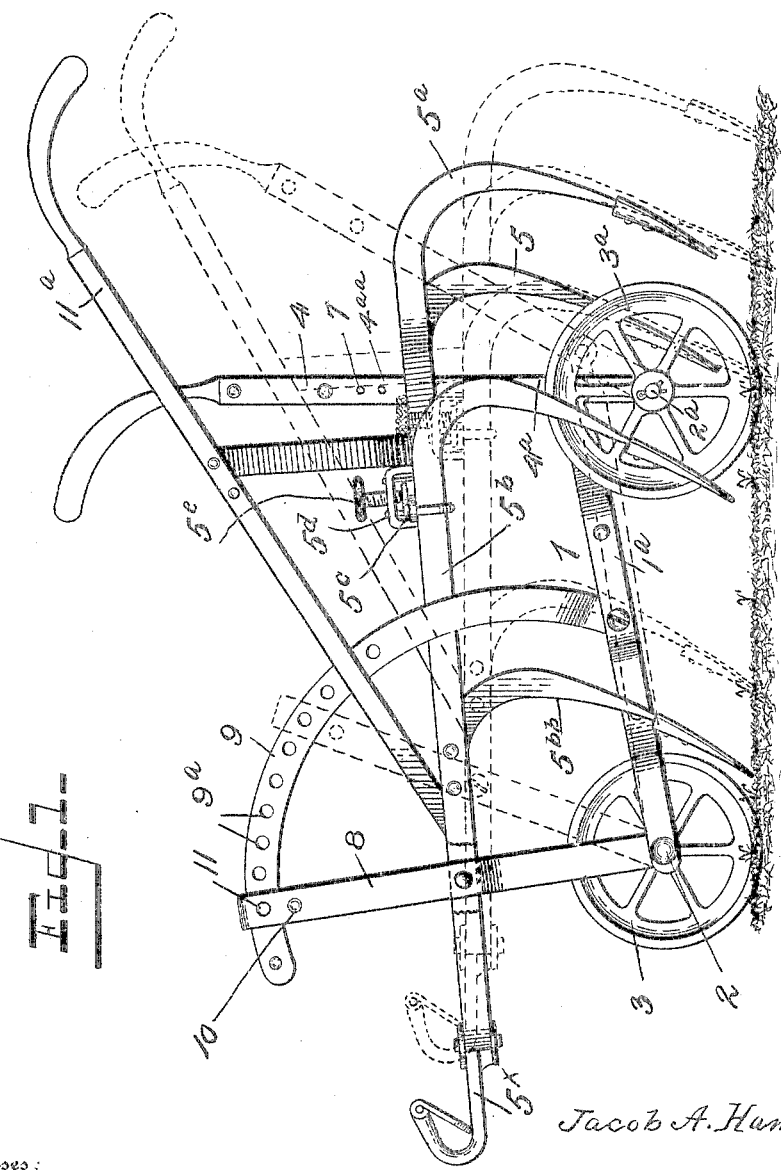
Witnesses:
W. H. Durand
J. H. Mester
Inventor:
Jacob A. Hamelback,
By Louis Bagger & Co.
Attorneys.

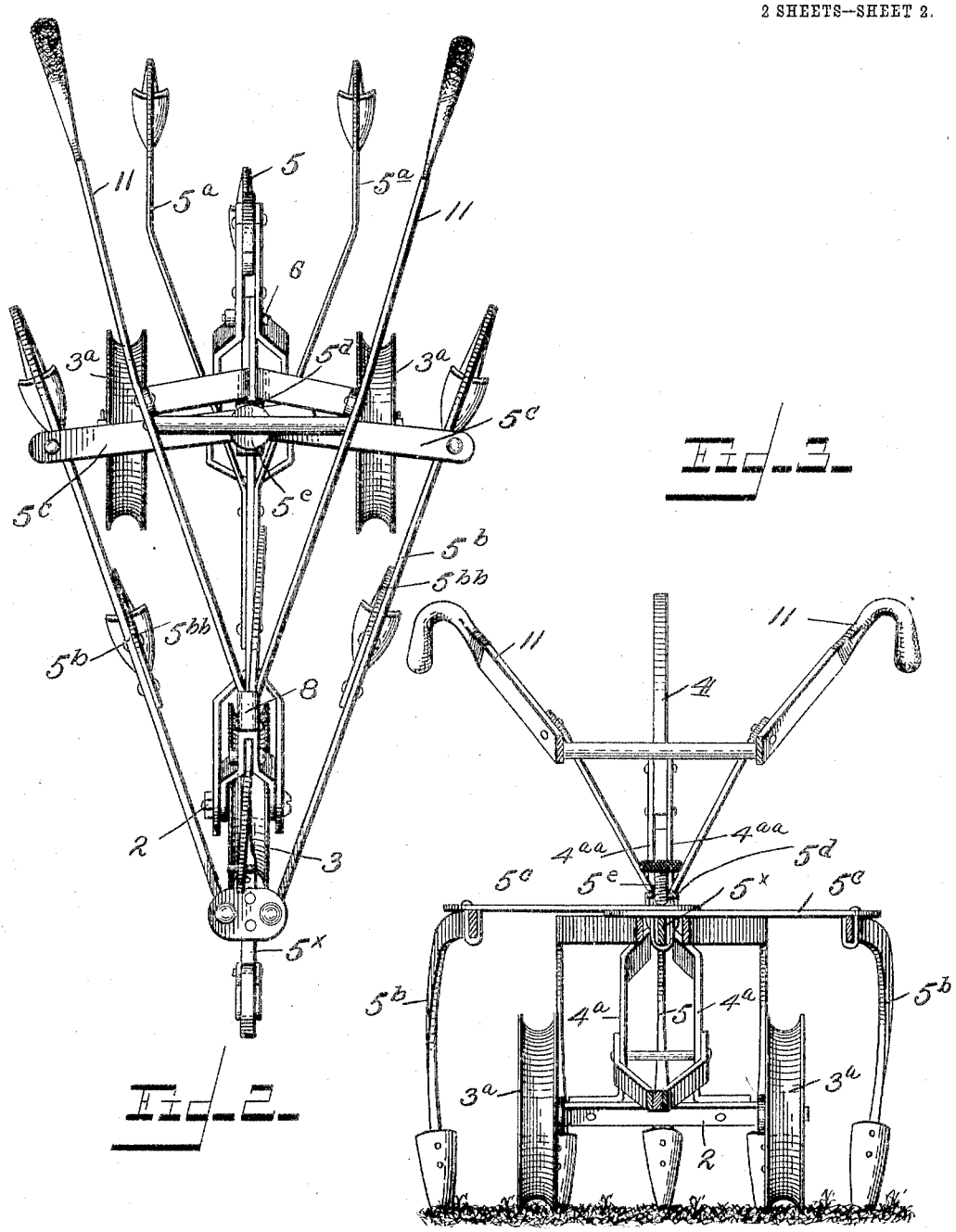

No. 794,009. Patented July 4, 1905.

UNITED STATES PATENT OFFICE.

JACOB A. HAMELBACK, OF NEWARK, OHIO.

SURFACE CULTIVATOR.

SPECIFICATION forming part of Letters Patent No. 794,009, dated July 4, 1905.

Application filed September 7, 1904. Serial No. 223,573.

*To all whom it may concern:*

Be it known that I, JACOB A. HAMELBACK, a citizen of the United States, residing at Newark, in the county of Licking and State of Ohio, have invented new and useful Improvements in Surface Cultivators, of which the following is a specification.

My invention relates to improvements in cultivators, more particularly for surface work or cultivation.

Said invention has for its object to provide for the ready adjustment of the machine for transportation or effective action and to promote convenience and facility of operation; and to these ends it consists of certain structural features, substantially as hereinafter more fully disclosed, and particularly pointed out by the claims.

In the accompanying drawings, illustrating the preferred embodiment of my invention, Figure 1 is a side elevation thereof with the parts shown in full lines in inoperative position, as when transported from place to place, and in dotted lines as when in use. Fig. 2 is a plan view of the same. Fig. 3 is a vertical cross-section of said invention.

In the carrying out of my invention I provide a reach 1, preferably of the construction shown, being substantially two longitudinal members or bars $1^a$, united or bolted compactly together throughout the greater portions of their lengths, with their end portions spread apart.

Axles 2 $2^a$ bear the forward single or caster wheel 3 and the rear wheel $3^a$, respectively, one being carried by the spread-apart forward end portions of the reach 1 and the other secured to preferably lateral or right-angled extensions or terminals $4^a$ of the lower ends of the vertical parallel members $4^{aa}$ of a hand-lever 4. Said lever has its said parallel members $4^{aa}$ preferably brought more closely together about at their mid-lengths than are their lower portions, said parallel members receiving therebetween and having pivotal connection with the central shovel or plow beam 5 about at that point and like connection farther down with the spread-apart rear ends of the reach 1, said beam being extended forward into the draft-bar $5^\times$. The latter connection—*i. e.*, between the lever 4 and reach 1—is made by a pin 6, inserted through the parallel members $4^{aa}$ of the lever 4 and said rear end portions of said reach. Said members are provided with holes 7 to permit of the adjustment of said point of connection as occasion or circumstances may require. A standard or yoke 8 has the lower ends of its members secured to the forward wheel-axle and the corresponding ends of the forward spread-apart portions of the reach 1, and which yoke is suitably pivoted to the draft-bar extension $5^\times$ of said plow-beam 5, the last named passing through said yoke to hold said yoke in upright position, as disclosed by Fig. 1, the otherwise-obstructing lateral plow or shovel beam being broken away for that purpose.

A quadrant-shaped bar or arm 9, having its lower end suitably pivoted or connected to the reach 1, about midway thereof, extends upward through and is guided by the yoke or standard 8 and has a plurality of adjusting-holes $9^a$ therethrough, any one of which may receive a pin 10, inserted through registering perforations or holes 11 in said yoke at its upper end to permit of the variable adjustment of the parts, as in bringing the plows into or putting them out of operation, and accordingly holding said parts when so adjusted.

Secured laterally of and to the central plow or shovel beam 5 are two additional plow or shovel beams $5^a$, with their curved rear end portions extending to points beyond the corresponding portion of said central beam. Similarly arranged to said beams $5^a$ are two further plow-beams $5^b$, with their forward ends suitably pivoted or connected to said central beam, so as to permit them to be moved laterally or horizontally, as may be required, said plow-beams having fixed or depending therefrom supplemental beams or standards $5^{bb}$, whose shovels aid the plowing or cultivating action. Said plow-beams have suitably connected thereto arms or bars $5^c$, and secured to the upper edge of the central beam 5 is a keeper or yoke $5^d$, receiving said arms, held therein by a set or holding screw $5^e$ to permit the requisite adjustment of said plow-beams. Suitable handles 11, applied to the central beam 5 in the usual way, are provided for controlling the movement of the cultivator.

It will be noted that the plow-beams being in the dotted-line position of Fig. 1, when of course the rear wheels will be elevated, by grasping and suitably actuating the hand-lever or moving it forward the reach 1 may be so adjusted as to permit the lowering of said rear wheels, thus elevating the plows or shovels out of contact with the surface or ground, as required or convenient for the removal or transportation of the cultivator from place to place. With this movement or actuation of the hand-lever the quadrant-bar and its guiding-yoke are caused to assume the position indicated in dotted lines in Fig. 1, which they are caused to maintain by suitably placing a holding-pin 10 in the requisite one of the holes 9ᵃ of said quadrant-bar, said pin having been previously removed from the holes 11ᵃ in the standard or yoke 8, and after said adjustment of parts reinserted through the latter holes to permit said pin to be passed through said requisite hole. In order to restore said parts to their initial position, as in bringing the shovels or plows into effective position or contact with the ground, the holding-pin 10 having been withdrawn, the hand-lever is moved into the dotted-line position, as in Fig. 1, &c., thus providing for the elevating of the rear end of the reach 1 with the corresponding wheels, accordingly lowering the shovels or plows. The holding-pin 10 is reinserted through the holes 11ᵃ of the yoke 8 and the registering one of the holes 9ᵃ of the quadrant-bar, thus securing the parts in effective or operative position.

Latitude, it will be understood, is allowed as to details herein, as they may be changed as circumstances suggest without departing from the spirit of my invention.

I claim—

1. A cultivator, employing a reach, carrying the forward wheel-axle, a yoke pivoted to the draft-bar and the forward axle, means effecting adjustable connection between said yoke and reach, and a hand-lever connected to the rear wheel-axle and to said reach, at its rear end, and suitably pivoted in position.

2. A cultivator, employing a reach carrying the forward wheel-axle, a yoke pivoted to the draft-bar and the forward axle, a quadrant-bar pivoted to said reach, about at its mid-length, and passing through said yoke, means for effecting adjustable connection between said quadrant-bar and yoke, and a hand-lever connected to the rear wheel-axle and to said reach, at its rear end, and suitably pivoted in position.

3. A cultivator, employing a reach carrying the forward wheel-axle, a yoke having registering holes therein pivoted to the draft-bar and the forward axle, a quadrant-bar having a plurality of adjusting-holes and guided within said yoke, and adjusting-pin engaging the holes in said quadrant-bar and yoke, and a hand-lever connected to the rear wheel-axle and to said reach, at its rear end, and suitably pivoted in position.

4. A cultivator, employing a reach carrying the forward wheel-axle, a yoke having registering holes therein and pivoted to the draft-bar and the forward axle, a serially-perforated quadrant-bar, an adjusting-pin for connecting said yoke and quadrant-bar, and a hand-lever having its lower end connected to said rear axle, and pivoted to the central shovel-beam.

In testimony whereof I have signed my name to this specification in the presence of two subscribing witnesses.

JACOB A. HAMELBACK.

Witnesses:
FREDERICH L. WOODBRIDGE,
SAMUEL S. ORR.